US010852533B2

(12) United States Patent
Miyatake et al.

(10) Patent No.: US 10,852,533 B2
(45) Date of Patent: Dec. 1, 2020

(54) OPTICAL SCANNING DEVICE, IMAGE DISPLAY DEVICE, AND VEHICLE

(71) Applicant: RICOH COMPANY, LTD., Tokyo (JP)

(72) Inventors: Naoki Miyatake, Kanagawa (JP); Naoki Nakamura, Saitama (JP)

(73) Assignee: RICOH COMPANY, LTD., Tokyo (JP)

( * ) Notice: Subject to any disclaimer, the term of this patent is extended or adjusted under 35 U.S.C. 154(b) by 153 days.

(21) Appl. No.: 16/060,137

(22) PCT Filed: Nov. 21, 2016

(86) PCT No.: PCT/JP2016/084514
§ 371 (c)(1),
(2) Date: Jun. 7, 2018

(87) PCT Pub. No.: WO2017/098913
PCT Pub. Date: Jun. 15, 2017

(65) Prior Publication Data
US 2018/0373025 A1    Dec. 27, 2018

(30) Foreign Application Priority Data
Dec. 10, 2015   (JP) ................................. 2015-240792

(51) Int. Cl.
*G02B 26/08*    (2006.01)
*G02B 26/10*    (2006.01)
(Continued)

(52) U.S. Cl.
CPC ............ *G02B 26/101* (2013.01); *B60K 35/00* (2013.01); *G02B 27/0101* (2013.01);
(Continued)

(58) Field of Classification Search
CPC .............. G02B 26/101; G02B 27/0101; G02B 2027/0145; G02B 2027/0121;
(Continued)

(56) References Cited

U.S. PATENT DOCUMENTS 7,154,651 B2    12/2006   Atsuumi et al.
7,161,724 B1    1/2007    Miyatake
(Continued)

FOREIGN PATENT DOCUMENTS

CN    1591081 A      3/2005
CN    101086554 A    12/2007
(Continued)

OTHER PUBLICATIONS

Office Action dated Sep. 9, 2019, issued in corresponding Korean Patent Application No. 10-2018-7015797, 10 pages (with English Translation).
(Continued)

*Primary Examiner* — Euncha P Cherry
(74) *Attorney, Agent, or Firm* — Xsensus LLP

(57) ABSTRACT

An optical scanning device includes: a light source unit configured to emit a light beam; a light deflecting unit configured to two-dimensionally deflect the light beam in a main scanning direction and a sub-scanning direction orthogonal to the main scanning direction; and an image formation unit configured to form an image by two-dimensional scanning of the light beam performed by the light deflecting unit, in which a flat plate configured to transmit light incident on the light deflecting unit and deflected reflection light from the light deflecting unit is arranged in an optical path of the light beam between the light deflecting unit and the image formation unit, and the flat plate is inclined with respect to the image formation unit in a cross section in the sub-scanning direction.

6 Claims, 11 Drawing Sheets

(51) Int. Cl.
*B60K 35/00* (2006.01)
*G02B 27/01* (2006.01)

(52) U.S. Cl.
CPC .. *B60K 2370/1529* (2019.05); *B60K 2370/23* (2019.05); *B60K 2370/333* (2019.05); *B60K 2370/334* (2019.05); *B60K 2370/39* (2019.05); *B60K 2370/48* (2019.05); *G02B 2027/0121* (2013.01); *G02B 2027/0145* (2013.01)

(58) Field of Classification Search
CPC ............ G02B 2027/0118; G02B 26/10; B60K 35/00; B60K 2370/48; B60K 2370/23; B60K 2370/1529; B60K 2370/334; B60K 2370/333; B60K 2370/39
See application file for complete search history.

(56) References Cited

U.S. PATENT DOCUMENTS

| | | | |
|---|---|---|---|
| 7,411,712 | B2 | 8/2008 | Nakajima et al. |
| RE42,865 | E | 10/2011 | Suzuki et al. |
| 9,997,093 | B2 * | 6/2018 | Atsuumi .............. G02B 26/101 |
| 2003/0206322 | A1 | 11/2003 | Atsuumi et al. |
| 2003/0214693 | A1 | 11/2003 | Hayashi et al. |
| 2004/0001241 | A1 | 1/2004 | Hayashi et al. |
| 2004/0165240 | A1 | 8/2004 | Suzuki et al. |
| 2004/0240000 | A1 | 12/2004 | Miyatake et al. |
| 2005/0052525 | A1 | 3/2005 | Ishibe |
| 2005/0094234 | A1 | 5/2005 | Miyatake et al. |
| 2006/0000990 | A1 | 1/2006 | Hayashi et al. |
| 2006/0203264 | A1 | 9/2006 | Miyatake |
| 2007/0002417 | A1 | 1/2007 | Hirakawa et al. |
| 2007/0030538 | A1 | 2/2007 | Hirakawa et al. |
| 2007/0081216 | A1 | 4/2007 | Miyatake |
| 2007/0146849 | A1 | 6/2007 | Miyatake et al. |
| 2007/0215800 | A1 | 9/2007 | Miyatake et al. |
| 2007/0285755 | A1 | 12/2007 | Ichihashi et al. |
| 2008/0062493 | A1 | 3/2008 | Miyatake |
| 2008/0068691 | A1 | 3/2008 | Miyatake |
| 2008/0180772 | A1 | 7/2008 | Miyatake et al. |
| 2009/0073526 | A1 | 3/2009 | Uchikawa |
| 2009/0073528 | A1 | 3/2009 | Miyatake |
| 2009/0168132 | A1 | 7/2009 | Miyatake |
| 2010/0091083 | A1 | 4/2010 | Itami et al. |
| 2011/0012874 | A1 | 1/2011 | Kurozuka |
| 2011/0063704 | A1 | 3/2011 | Miyatake |
| 2012/0177409 | A1 | 7/2012 | Arai et al. |
| 2012/0236380 | A1 | 9/2012 | Miyatake et al. |
| 2012/0314144 | A1 | 12/2012 | Sugita et al. |
| 2013/0083148 | A1 | 4/2013 | Miyatake et al. |
| 2013/0147895 | A1 | 6/2013 | Miyatake |
| 2014/0009555 | A1 | 1/2014 | Itami et al. |
| 2014/0204166 | A1 | 7/2014 | Itami et al. |
| 2015/0055204 | A1 | 2/2015 | Ichii |
| 2015/0097910 | A1 | 4/2015 | Itami et al. |
| 2015/0268462 | A1 | 9/2015 | Itami et al. |
| 2015/0346487 | A1 | 12/2015 | Miyatake et al. |
| 2016/0116735 | A1 | 4/2016 | Hayashi et al. |
| 2016/0147060 | A1 | 5/2016 | Itami et al. |
| 2016/0266384 | A1 | 9/2016 | Nakamura et al. |
| 2017/0003506 | A1 | 1/2017 | Miyatake et al. |

FOREIGN PATENT DOCUMENTS

| | | |
|---|---|---|
| CN | 102819147 A | 12/2012 |
| CN | 104423036 A | 3/2015 |
| EP | 1610099 A3 | 5/2006 |
| EP | 1 610 099 B1 | 2/2008 |
| EP | 2 840 058 A1 | 2/2015 |
| JP | 2009-069457 | 4/2009 |
| JP | 2011-186357 | 9/2011 |
| JP | 5050862 | 8/2012 |
| JP | 5179575 | 1/2013 |
| JP | 2013-125041 | 6/2013 |
| JP | 2014-095796 | 5/2014 |
| JP | 2015041039 A | 3/2015 |
| JP | 2015-148654 | 8/2015 |
| KR | 1020150003906 A | 1/2015 |
| WO | 2015146071 A1 | 10/2015 |

OTHER PUBLICATIONS

International Search Report dated Jan. 24, 2017 in PCT/JP2016/084514 filed on Nov. 21, 2016.
Extended European Search Report dated Oct. 18, 2018 in Patent Application No. 16872813.7, citing documents AA, AO and AP therein, 22 pages.
Office Action dated Dec. 20, 2019, issued in corresponding Chinese Patent Application No. 201680070409.8, 15 pages with English Translation.
Office Action dated Jul. 6, 2020, issued in corresponding Indian Patent Application No. 201847020891, with English translation, 6 pages.

* cited by examiner

OPTICAL SCANNING DEVICE, IMAGE DISPLAY DEVICE, AND VEHICLE

FIELD

The present invention relates to an optical scanning device, an image display device, and a vehicle.

BACKGROUND

There has been known an image display device that enables an operator (driver) to visually recognize useful information with small line-of-sight movement when the operator steers a moving object, the device mounted on the moving object such as a vehicle, an aircraft, and a ship. Such an image display device is generally called a head-up display (hereinafter referred to as the "HUD").

The HUD forms an intermediate image based on information on the moving object, and displays the intermediate image as a virtual image in the driver's field of view. Several kinds of systems that form the intermediate image in the HUD have been known. Examples thereof include a panel system using an imaging device such as liquid crystal, a laser scanning system that two-dimensionally scans a laser beam emitted from a laser diode (hereinafter referred to as the LD), and the like. In the panel system, light emission of the entire screen is partially shielded to form an intermediate image. In the laser scanning system, "light emission" or "non-light emission" is allocated to each pixel to form an intermediate image (for example, see Patent Literature 1).

The laser scanning system can form the intermediate image with higher contrast than the panel system. It is desirable that unnecessary light other than a laser beam to form the intermediate image (hereinafter referred to as "unnecessary light") do not reach a portion forming the intermediate image in order to increase the contrast of the intermediate image and enhance the visibility of the virtual image.

In addition, it is necessary to control a light emission timing of the LD in order to form the intermediate image at a desired position in the laser scanning system. For this purpose, a light receiving element that detects scanning light consisting of a laser beam from the LD is used. When the unnecessary light as described above is incident on the light receiving element, a formation position of the intermediate image is disturbed, which causes a decrease in image quality of the intermediate image.

In addition, the visibility of the virtual image to be displayed in the HUD may decrease depending on brightness of the background in some cases. Therefore, it is desirable to be capable of adjusting brightness of the intermediate image in relation to the brightness of the background of the virtual image.

SUMMARY

Technical Problem

An object of the present invention is to provide an optical scanning device capable of forming a high-contrast intermediate image even when unnecessary light intrudes and capable of stably displaying a virtual image with good image quality.

Solution to Problem

An optical scanning device according to the present invention includes: a light source unit configured to emit a light beam; a light deflecting unit configured to two-dimensionally deflect the light beam in a main scanning direction and a sub-scanning direction orthogonal to the main scanning direction; and an image formation unit configured to form an image by two-dimensional scanning of the light beam performed by the light deflecting unit, wherein a flat plate configured to transmit light incident on the light deflecting unit and deflected reflection light from the light deflecting unit, is arranged in an optical path of the light beam between the light deflecting unit and the image formation unit, and the flat plate is inclined with respect to the image formation unit in a cross section in the sub-scanning direction.

Advantageous Effects of Invention

According to the present invention, it is possible to form the high-contrast intermediate image even when the unnecessary light intrudes and to stably display the virtual image with good image quality.

DESCRIPTION OF EMBODIMENTS

Hereinafter, embodiments of an optical scanning device, an image display device, and a vehicle according to the present invention will be described with reference to the drawings. First, an embodiment of an image display device including an optical scanning device will be described.

Embodiment

Outline of Image Display Device

Figure 1:
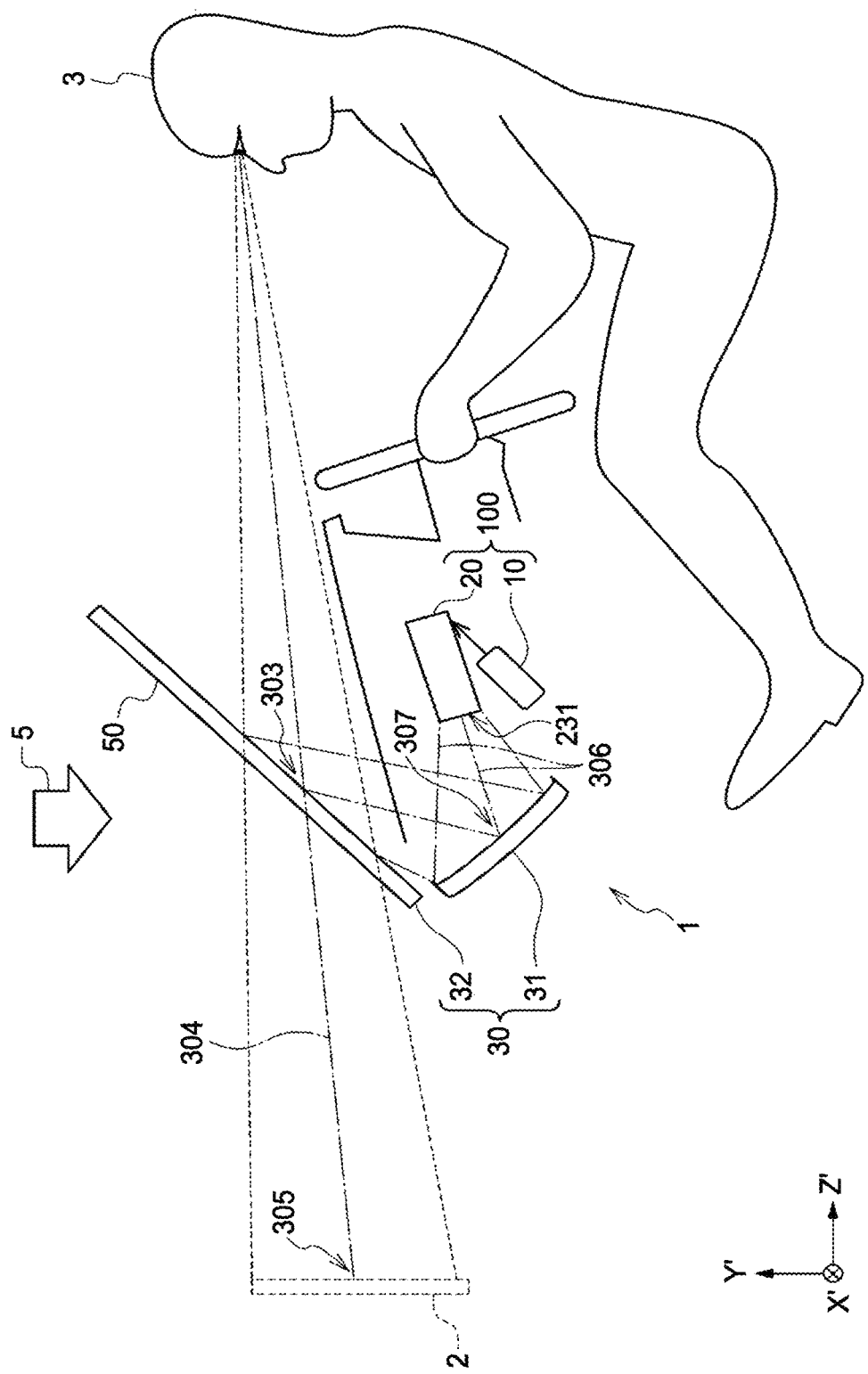
FIG. 1 is a configuration view illustrating an example of an embodiment of an image display device according to the present invention.

As illustrated in FIG. 1, an HUD 1, which is an embodiment of the image display device according to the present invention, is a device mounted on and used in a vehicle. The HUD 1 displays information useful for a driver 3 as a virtual image 2 in the field of view of the driver 3 of the vehicle. Here, the "information useful for the driver 3" is information including information on an object or the like existing in the field of view of the driver 3, information on an operation of the vehicle, and the like. In addition, the "information useful for the driver 3" also includes information on warning or the like to provide notification of an abnormality in the operation of the vehicle. Hereinafter, the above-described "information useful for the driver 3" may be referred to as the "information" in some cases in the description of the present specification.

A form of the HUD 1 illustrated in FIG. 1 is a form in which a windshield 50, which is a front windshield of the vehicle, is used as an optical combiner 32. The optical combiner 32 is a transmission reflection member onto which an intermediate image 231 to be described later is projected and which reflects the projected intermediate image 231 toward the driver 3 and transmits light (external light) from environment or an object existing in the field of view of the driver 3. Incidentally, a transmission reflection type optical element that is separated from the windshield 50 may be used as the optical combiner 32.

The HUD 1 includes a light source unit 10, a scanning optical system 20, and an observation optical system 30. The light source unit 10 and the scanning optical system 20 constitute an optical scanning unit 100 which is the optical scanning device according to the present invention.

The intermediate image 231 is formed in the optical scanning unit 100. The intermediate image 231 appears on a side close to a concave mirror 31 forming a part of the observation optical system 30, in the optical scanning unit 100. The concave mirror 31 reflects the intermediate image 231 to be projected onto the optical combiner 32. The optical combiner 32 displays the intermediate image 231 so that the driver 3 can visually recognize the virtual image 2.

Outline of Light Source Unit 10

The light source unit 10 emits a light beam for forming the intermediate image 231. When the virtual image 2 is set to be a color image, light beams corresponding to three primary colors of light required for the color image is emitted from the light source unit 10.

Outline of Scanning Optical System 20

The scanning optical system 20 forms the intermediate image 231 based on the light beam emitted from the light source unit 10. The scanning optical system 20 emits the formed intermediate image 231 toward the observation optical system 30. Incidentally, a general outer shape of the intermediate image 231 is a rectangle or the like.

Outline of Observation Optical System 30

The observation optical system 30 includes the concave mirror 31, which is a reflective optical element, and the optical combiner 32. The intermediate image 231 formed in the scanning optical system 20 is magnified in the concave mirror 31 and projected onto the optical combiner 32. The magnified and projected intermediate image 231 is reflected by the optical combiner 32 toward the driver 3.

The intermediate image 231 reflected by the optical combiner 32 is visually recognized as the virtual image 2 at a position different from a physical position of the optical combiner 32 (a position in a direction away from the driver 3) in the vision of the driver 3. As described above, the information displayed by the virtual image 2 is information on the front of the vehicle, information on the operation of the vehicle, navigation information such as speed and travel distance of the vehicle, a destination display, and the like.

Incidentally, a viewpoint position serving as a reference (a reference eye point) is simply illustrated as a viewpoint of the driver 3. A viewpoint range of the driver 3 is equal to or smaller than a driver's eye range for a vehicle (JIS D0021).

Here, the "direction" according to the description of the present embodiment will be defined. The intermediate image 231 is an image generated by two-dimensional scanning executed by the scanning optical system 20. Here, the two-dimensional scanning is scanning obtained by combining scanning in two directions of a main scanning direction and a sub-scanning direction. In addition, the main scanning direction and the sub-scanning direction correspond to a left-right direction and an up-down direction of the intermediate image 231.

The left-right direction of the intermediate image 231 corresponds to a direction which is the same as a direction that is viewed as a left-right direction when the driver 3 visually recognizes the virtual image 2. Similarly, the up-down direction of the intermediate image 231 corresponds to a direction which is the same as a direction that is viewed as an up-down direction when the driver 3 visually recognizes the virtual image 2. The left-right direction of the intermediate image 231 is the main scanning direction, and the up-down direction thereof is the sub-scanning direction.

In the following description, the main scanning direction at the time of generating the intermediate image 231 will be defined as an "X direction" and the sub-scanning direction thereof will be defined as a "Y direction". When describing the lateral direction in the virtual image 2, the lateral direction will be referred to as the "X direction" as the direction corresponding to the main scanning direction in the intermediate image 231 even if there is a difference in physical directions. In addition, when describing the Y direction in the virtual image 2, the Y direction will be referred to as the "Y direction" as the direction corresponding to the sub-scanning direction in the intermediate image 231 even if there is a difference in physical directions.

In addition, when the HUD 1 is mounted on the vehicle as illustrated in FIG. 1, a traveling direction of the vehicle will be defined as a "Z' direction", a left-right direction of the vehicle will be defined as an "X' direction" and an up-down direction of the vehicle will be defined as a "Y' direction". In this case, a direction toward the driver 3 from the virtual image 2 (a backward direction of the vehicle) will be defined as the +Z' direction and a line-of-sight direction of the driver 3 (a forward direction of the vehicle) is defined as a -Z' direction. In addition, a rightward direction (a back direction of the sheet) of the driver 3 is defined as a +X' direction, and a leftward direction of the driver 3 is defined as a -X' direction (a front direction of the sheet). In addition, an upward direction of the driver 3 is defined as a +Y' direction, and a downward direction of the driver 3 is defined as a -Y' direction.

In FIG. 1, the X direction of the virtual image 2 and the X' direction (left-right direction) of the vehicle coincide. In addition, the Y direction of the virtual image 2 and the Y' direction (up-down direction) of the vehicle coincide. On the other hand, there is a case where the X direction (main scanning direction) and the X' direction (left-right direction) of the intermediate image 231 generated in the scanning optical system 20 do not coincide. Similarly, there is a case where the Y direction (sub-scanning direction) and the Y' direction (up-down direction) of the intermediate image 231 do not coincide. This is because the physical directions of the intermediate image 231 in the main scanning direction and the sub-scanning direction are not necessarily orthogonal to an X'-axis, a Y'-axis, and a Z'-axis depending on arrangement and directions of optical elements in the scanning optical system 20 and optical arrangement of the scanning optical system 20 and the observation optical system 30.

As illustrated in FIG. 1, a center of an incidence region of the image light projected from the concave mirror 31 to the optical combiner 32 is set as an incidence region center 303. As illustrated in FIG. 1, a tangential plane at the incidence region center 303 is inclined with respect to a first virtual axis 304 connecting the viewpoint of the driver 3 and a center of the virtual image 2 (a virtual image center 305) when viewed from the X'-axis direction. Incidentally, the first virtual axis 304 is an axis that passes through the incidence region center 303. When assuming a second virtual axis 306 that connects a center of the intermediate image 231 formed in the scanning optical system 20 and a reflection surface center 307, the second virtual axis 306 is inclined with respect to the first virtual axis 304 when viewed from the X'-axis direction as illustrated in FIG. 1. In addition, the second virtual axis 306 is inclined with respect to the first virtual axis 304 when viewed from the Y'-axis direction.

Configuration of Light Source Unit 10

Figure 2:
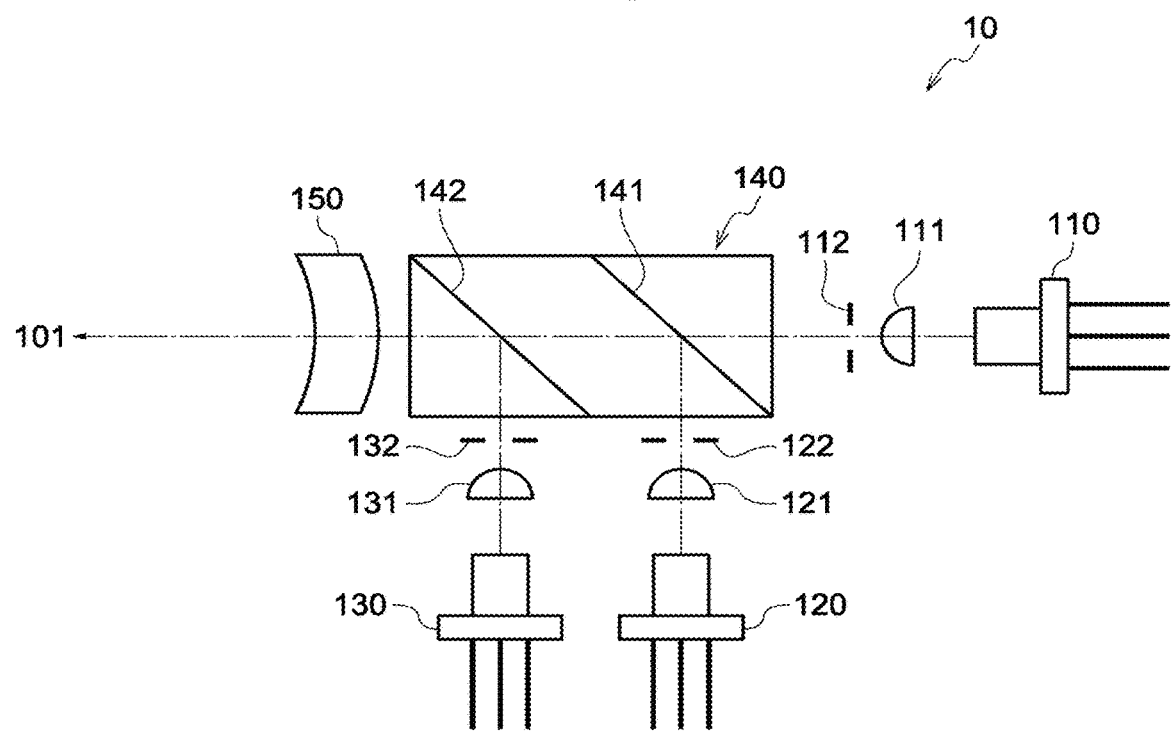
FIG. 2 is a configuration view illustrating an example of a light source unit according to the image display device.

Next, a detailed configuration of the light source unit 10 will be described with reference to FIG. 2. The light source unit 10 combines the light beams corresponding to the three primary colors of light into one light beam and emit the combined light beam so that the virtual image 2 is the color image. In the following description, the light beam emitted from the light source unit 10 and directed to a light scanning means to be described later will be referred to as a first light beam 101.

The light source unit 10 includes, for example, three semiconductor laser elements. Each of the semiconductor laser elements is a light source element corresponding to one of the three primary colors of light. A first laser element 110 is a laser element that emits laser light of red (R). A second laser element 120 is a laser element that emits laser light of green (G). A third laser element 130 is a laser element that emits laser light of blue (B).

Incidentally, a laser diode (LD) called an edge-emitting laser or a vertical-cavity surface-emitting laser (VCSEL) can be also used for each laser element. In addition, an LED element can also be used instead of the semiconductor laser element.

In addition to the respective laser elements, the light source unit 10 includes coupling lenses each of which suppresses divergence of the laser light emitted from one of laser elements. In addition, the light source unit 10 includes apertures each of which regulates a light beam diameter of laser light from one of coupling lenses, for shaping. In addition, the light source unit 10 includes a beam combining prism 140 that combines the laser light beams of the respective colors shaped by the respective apertures and emit the combined light beam, and a lens 150.

The coupling lenses corresponding to the laser elements of respective colors will be referred to as a first coupling lens 111, a second coupling lens 121, and a third coupling lens 131.

The apertures corresponding to the respective laser elements will be referred to as a first aperture 112, a second aperture 122, and a third aperture 132.

The beam combining prism 140 includes a first dichroic film 141 that transmits red laser light and reflects green laser light and a second dichroic film 142 that transmits red and green laser light and reflects blue laser light.

The lens 150 converts the light beam emitted from the beam combining prism 140 into a "beam in a desired condensed state".

A wavelength XR of the light beam (laser light) emitted from the first laser element 110 is, for example, 640 nm. A wavelength XG of the light beam (laser light) emitted from the second laser element 120 is, for example, 530 nm. A wavelength XB of the light beam (laser light) emitted from the third laser element 130 is, for example, 445 nm.

The red laser light emitted from the first laser element 110 is incident on the beam combining prism 140 via the first coupling lens 111 and the first aperture 112. The red laser light incident on the beam combining prism 140 passes through the first dichroic film 141 and travels straight.

The green laser light emitted from the second laser element 120 is incident on the beam combining prism 140 via the second coupling lens 121 and the second aperture 122. The green laser light incident on the beam combining prism 140 is reflected by the first dichroic film 141 to be directed in the same direction as the red laser light (in the direction toward the second dichroic film 142).

The blue laser light emitted from the third laser element 130 is incident on the beam combining prism 140 via the third coupling lens 131 and the third aperture 132. The blue laser light incident on the beam combining prism 140 is reflected by the second dichroic film 142 to be directed in the same direction as the red laser light and the green laser light.

In the manner described above, the light beam obtained by combining the red laser light, the green laser light, and the blue laser light is emitted from the beam combining prism 140.

The light beam emitted from the beam combining prism 140 is converted by the lens 150 into the first light beam 101 which is the "beam in a desired condensed state". The first light beam 101 is a light beam into which the red laser light, the green laser light, and the blue laser light are combined as one laser light beam.

The laser light beam of each color of R (red), G (green), and B (blue) included in the first light beam 101 is intensity-modulated in accordance with an image signal relating to a "two-dimensional color image" to be displayed. Alternatively, the intensity modulation is performed in accordance with image data indicating the relevant image information relating to the "two-dimensional color image" to be displayed. The intensity modulation of the laser light beams may be performed using a system that directly modulates a semiconductor laser of each color (a direct modulation system) or a system that modulates a laser light beam emitted from a semiconductor laser of each color (an external modulation system).

Incidentally, apertures having various shapes such as a circle, an ellipse, a rectangle, and a square, may be used as each aperture in accordance with a divergence angle of a light beam or the like. In addition, the lens 150 is a meniscus lens that has a concave surface toward a MEMS mirror 21 to be described later.

Configuration of Scanning Optical System 20

Figure 3:
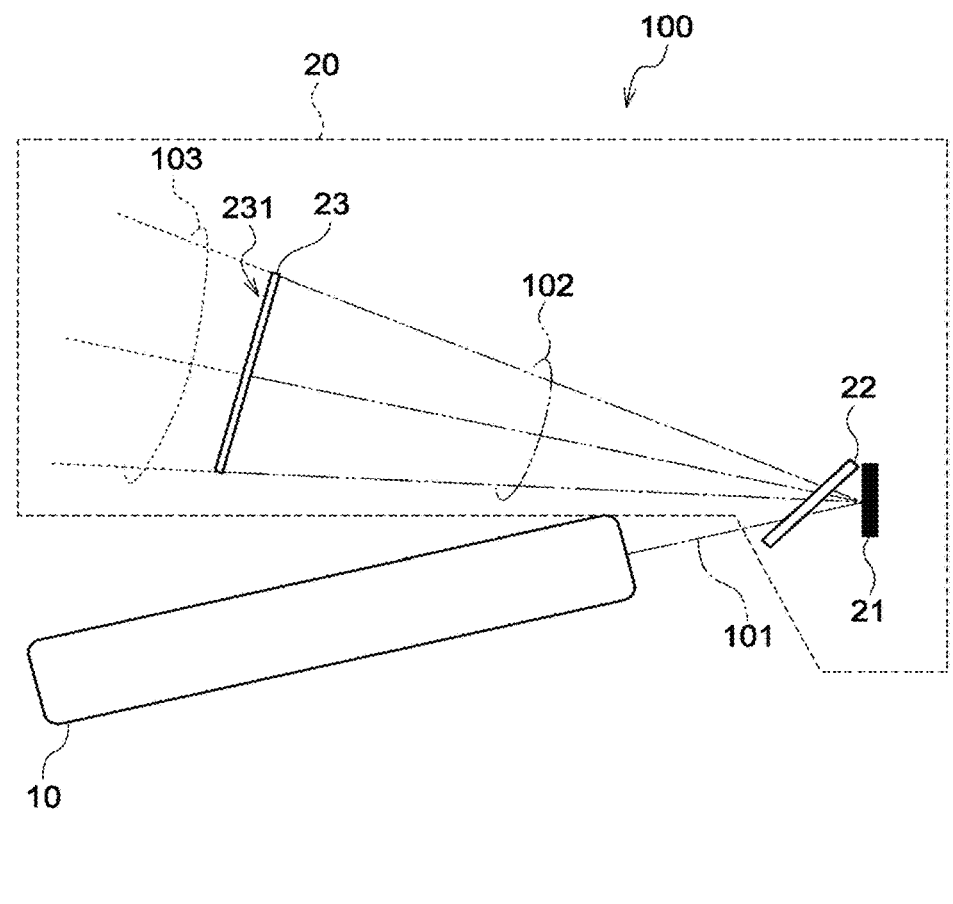
FIG. 3 is a configuration view illustrating an example of a scanning optical system according to the image display device.

As illustrated in FIG. 3, the scanning optical system 20 includes the MEMS mirror 21 that deflects the first light beam 101, a transparent flat plate 22, and a microlens array 23 which is an intermediate image formation unit.

The scanning optical system 20 is an optical system that deflects the first light beam 101 emitted from the light source unit 10 by the MEMS mirror 21. The light beam deflected in the scanning optical system 20 is incident on the microlens array 23 as a second light beam 102.

As illustrated in FIG. 3, the first light beam 101 from the light source unit 10 passes through the transparent flat plate 22 in the middle of entering the MEMS mirror 21. In addition, the second light beam 102 deflected by the MEMS mirror 21 passes through the transparent flat plate 22 in the middle of entering the microlens array 23. That is, both the light beam incident on the MEMS mirror 21 and the light beam emitted from the MEMS mirror 21 pass through the transparent flat plate 22.

More specifically, the MEMS mirror 21 is arranged in a sealed region, and entry of the laser light into the region and emission of the laser light from the region are performed through the transparent flat plate 22. Incidentally, the transparent flat plate 22, the MEMS mirror 21, and the like are configured as an integrated module.

The microlens array 23 is scanned in two dimensions including the main scanning direction and the sub-scanning direction with the second light beam 102 deflected by the MEMS mirror 21. The intermediate image 231 is generated by the two-dimensional scanning with respect to the microlens array 23. The image light 103 according to the generated intermediate image 231 is emitted from an emission surface of the microlens array 23 and is directed to the observation optical system 30.

Description of MEMS Mirror 21

Figure 4:
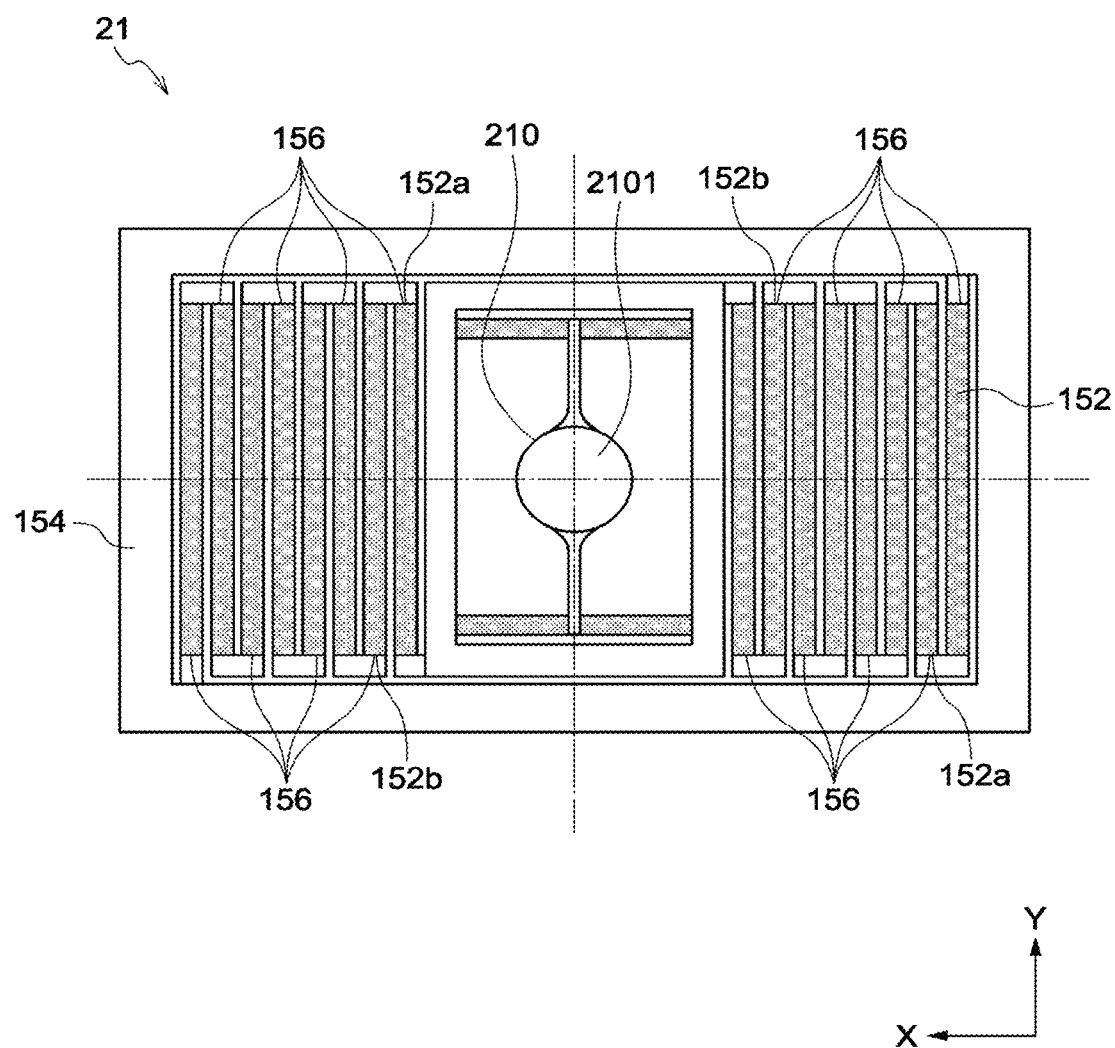
FIG. 4 is a plan view illustrating an example of an optical scanning means according to the image display device.

Here, the MEMS mirror 21 will be described in detail with reference to FIG. 4. The MEMS mirror 21 corresponds to micro electro mechanical systems (MEMS) manufactured as a micro-oscillating mirror element by a semiconductor process or the like, and includes a micromirror 210 in a central portion thereof. The micromirror 210 is a light deflecting unit that deflects the first light beam 101 emitted from the light source unit 10 and two-dimensionally scans the microlens array 23.

The micromirror 210 has a reflection surface 2101 that reflects the first light beam 101. The reflection surface 2101 is configured to rotate about two axes. When the reflection surface 2101 is rotated about the axis in the Y direction, a traveling direction of the second light beam 102 changes with respect to the X direction. Therefore, when the reflection surface 2101 is rotated about the axis in the Y direction, it is possible to execute main scanning for generating the intermediate image 231. In addition, when the reflection surface 2101 is rotated about the axis in the X direction, the traveling direction of the second light beam 102 changes with respect to the Y direction. Therefore, when the reflection surface 2101 is rotated about the axis in the X direction, it is possible to execute sub-scanning for generating the intermediate image 231. That is, the X direction corresponds to the main scanning direction, and the Y direction corresponds to the sub-scanning direction in FIG. 4.

A pair of meandering crossbeam portions 152 formed to meander through a plurality of folded portions is arranged on both sides of the micromirror 210 in the X direction. Crossbeams folded and adjacent to each other in the meandering crossbeam portions 152 are divided into a first crossbeam portion 152a and a second crossbeam portion 152b, and each crossbeam portion includes a piezoelectric member 156. The piezoelectric member 156 used here is, for example, PZT.

Voltages to be applied to the first crossbeam portion 152a and the second crossbeam portion 152b are independently applied to adjacent crossbeams. These independently applied voltages have different voltage values from each other. Different warps occur in the first crossbeam portion 152a and the second crossbeam portion 152b, to which the different voltages are applied. A direction of the warp is determined depending on the applied voltage. That is, the first crossbeam portions 152a and the second crossbeam portions 152b adjacent to each other are deflected in directions different from each other. Incidentally, the meandering crossbeam portion 152 is supported by a frame member 154.

As the above-described deflection is accumulated, the micromirror 210 rotates so as to change the direction of the reflection surface 2101 with respect to the X direction about the axis in the X direction. The first light beam 101 is reflected by the rotation of the reflection surface 2101 about the axis in the X direction and scans the microlens array 23 in the Y direction as the second light beam 102.

The MEMS mirror 21 performs sine wave oscillation in the main scanning direction and sawtooth oscillation in the sub-scanning direction to two-dimensionally deflect the first light beam 101 into the second light beam, thereby two-dimensionally scanning the microlens array 23.

When the MEMS mirror 21 having the above configuration is used, the HUD 1 can perform optical scanning in the vertical direction (Y direction) using the axis in the X direction as the rotation center with a low voltage. On the other hand, optical scanning in the horizontal direction (X direction) using the axis in the Y direction as the rotation center is performed through resonance using a torsion bar or the like connected to the micromirror 210.

Description of Microlens Array 23

Next, the microlens array 23 will be described in detail. In the microlens array 23, a lens surface on which fine convex lenses are two-dimensionally arranged is an incidence surface, and a flat surface opposite to the lens surface is an emission surface. Incidentally, an optical element used as the microlens array 23 is not limited to the above-described example, and a diffusion plate, a transmission screen, a reflection screen, or the like may be adopted.

The second light beam 102 incident on the lens surface is diffused and emitted from the emission surface. The scanning performed by the MEMS mirror 21 is, for example, a raster scan in which the main scanning direction is scanned at high speed and the sub-scanning direction is scanned at low speed.

As described above, the first light beam 101 emitted from the light source unit 10 of the HUD 1 supports color. Therefore, the intermediate image 231 formed in the microlens array 23 is the color image. Incidentally, the monochrome intermediate image 231 may be formed in the microlens array 23.

Figure 5:
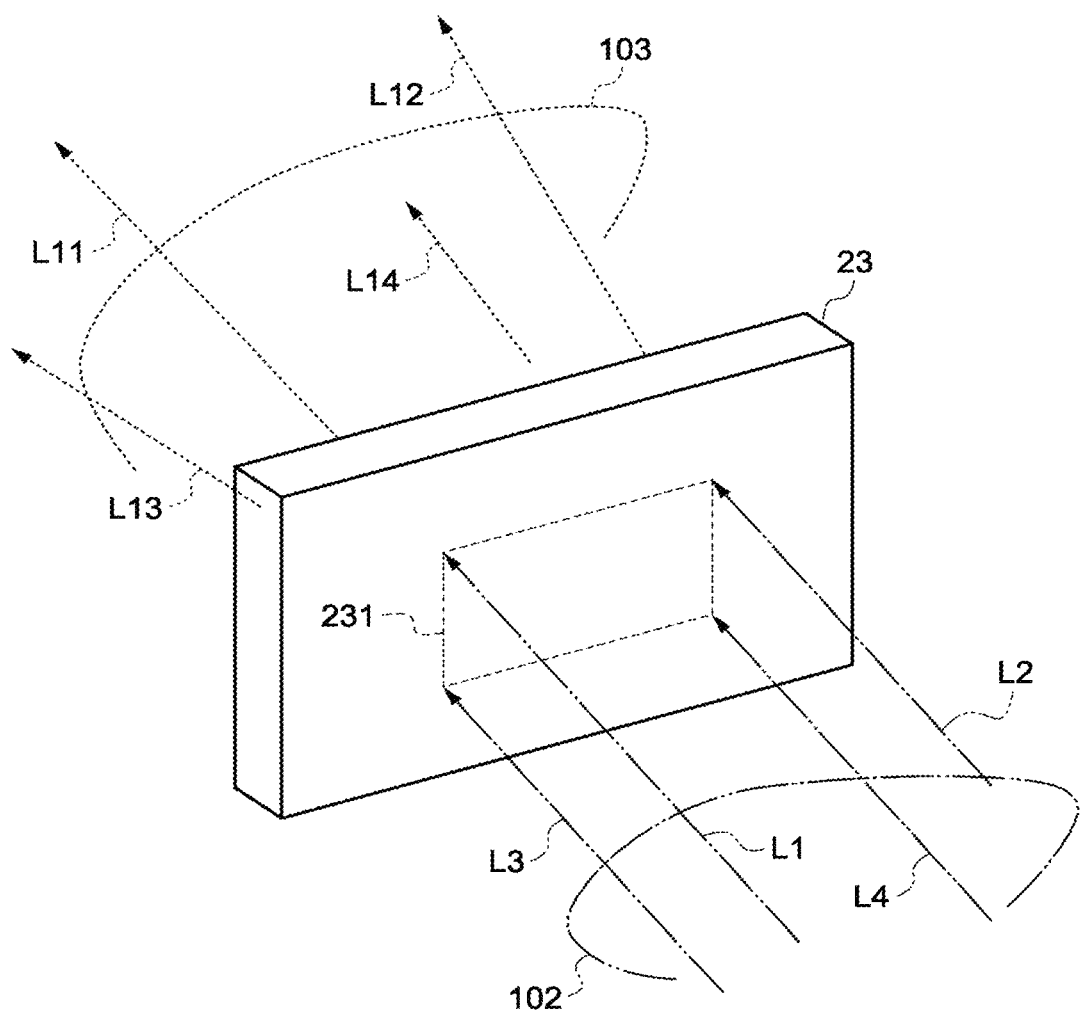
FIG. 5 is a perspective view illustrating an example of an intermediate image formation unit according to the image display device.

FIG. 5 is a perspective view of the microlens array 23 as viewed from an incidence direction of the second light beam 102. A rectangle indicated by a dotted line in FIG. 5 represents a virtual contour of the intermediate image 231. With the first light beam 101 which has been two-dimensionally deflected by the MEMS mirror 21, as the second light beam 102, scan is performed along the main scanning direction from L1 to L2 illustrated in FIG. 5 as the second light beam 102. Next, scan is performed along the main scanning direction after moving downward by one step in the sub-scanning direction from L1. Finally, the intermediate image 231 of one frame is formed by main scanning from L3 to L4. As described above, the lateral direction of the intermediate image 231 is the main scanning direction, and the longitudinal direction orthogonal thereto is the sub-scanning direction. The intermediate image 231 is formed for each frame at a predetermined time (scanning time) in the main scanning direction and the sub-scanning direction. When the scanning of one frame is completed, the main scanning starts from L1 in order to form the intermediate image 231 of the next frame within the scanning time.

The intermediate image 231 formed at each moment (each frame rate) in the microlens array 23 is formed by "only the pixel irradiated with the second light beam 102 at that moment". Therefore, the "intermediate image 231 which is a two-dimensional color image" is a set of pixels displayed at each moment of two-dimensional scanning using the second light beam 102.

Since the intermediate image 231 is emitted while being scattered by the microlens array 23, the intermediate image 231 can be visually recognized as the virtual image 2 even if positions of eyes of the driver 3 change due to an attitude of the driver 3 or the like.

Control System of Optical Scanning Unit 100

Figure 6:
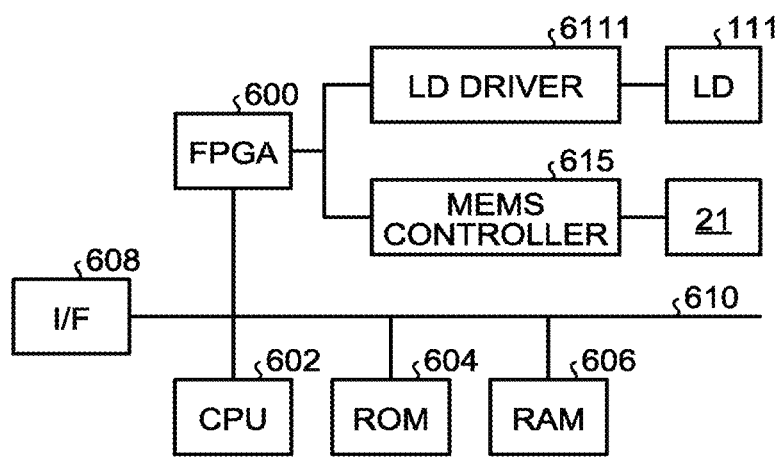
FIG. 6 is a block diagram illustrating an example of a hardware configuration of the image display device.

Here, a configuration of a control system that controls an operation of the optical scanning unit 100 of the HUD 1 will be described. As illustrated in FIG. 6, the HUD 1 includes an FPGA 600, a CPU 602, a ROM 604, a RAM 606, an I/F 608, a bus line 610, an LD driver 6111, and a MEMS controller 615.

The FPGA 600 operates the light source unit 10 and the MEMS mirror 21 using the LD driver 6111 and the MEMS controller 615. The CPU 602 is a processor that controls an operation of each piece of the above-described hardware provided in the HUD 1. The ROM 604 is a semiconductor memory that stores an image processing program to be executed by the CPU 602 to control each function of the HUD 1. The RAM 606 is a semiconductor memory that is used as a work area when the CPU 602 executes control processing of each piece of hardware.

The I/F 608 is a contact point that connects the HUD 1 to an external controller or the like. For example, the HUD 1 is connected to a controller area network (CAN) or the like via the I/F 608. As a result, the HUD 1 can operate while communicating with another external controller or the like connected via the CAN.

Functional Configuration of Optical Scanning Unit 100

Figure 7:
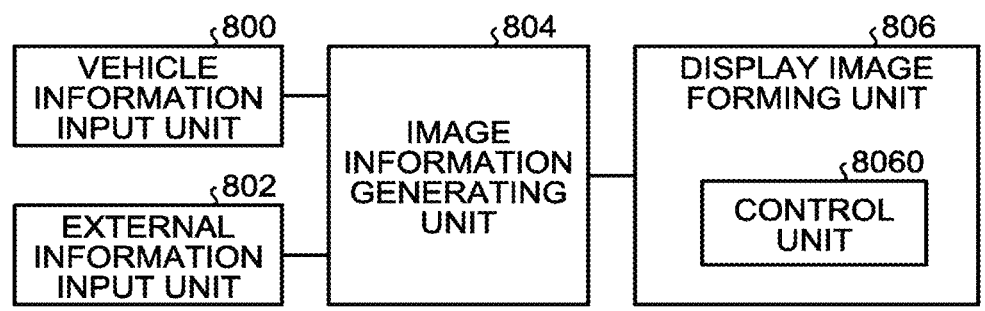
FIG. 7 is a functional block diagram illustrating an example of a functional configuration of the image display device.

Next, a functional configuration of the optical scanning unit 100 included in the HUD 1 will be described. As illustrated in FIG. 7, the optical scanning unit 100 includes a vehicle information input unit 800, an external information input unit 802, an image information generating unit 804, and a display image forming unit 806.

The vehicle information input unit 800 acquires information (for example, travel speed, travel distance, and the like of the vehicle) from another external controller or the like connected via the I/F 608.

The external information input unit 802 acquires information (for example, position information based on a GPS, traffic information from a navigation device, and the like) from another external controller or the like connected via the I/F 608.

The image information generating unit 804 generates information for forming the intermediate image 231 which serves as a source of the virtual image 2 (see FIG. 1) based on the information input from the vehicle information input unit 800 and the external information input unit 802.

The display image forming unit 806 includes a control unit 8060. The control unit 8060 controls the operations of the light source unit 10 and the scanning optical system 20 based on the information generated by the image information generating unit 804. With this control function, the intermediate image 231 to be projected onto the windshield 50 is generated. With the operations of the functional blocks described above, it is possible to create a state where the virtual image 2 is visually recognized at the viewpoint of the driver 3.

The description will be given returning to FIG. 1. The HUD 1 is configured such that with the intermediate image formation unit (the microlens array 23) included in the optical scanning unit 100 as a boundary, the outside of the intermediate image formation unit connects with a space inside the vehicle. There is a case where unnecessary light 5 such as sunlight which affects the display of the virtual image 2, enters the inside from the outside of the vehicle. The unnecessary light 5 is not limited to light arriving from above the vehicle, such as sunlight as exemplified in FIG. 1, and arrives from various angles.

In addition, when the unnecessary light 5 passes through the observation optical system 30 and is incident on the microlens array 23, a state where the unnecessary light 5 is emitted from the microlens array 23 to the MEMS mirror 21 is reached. In this case, a situation where light different from the second light beam 102 forming the intermediate image 231 affects the intermediate image 231 is reached. As described above, the unnecessary light 5 causes a decrease in contrast of the intermediate image 231, and also causes a decrease in image quality of the intermediate image 231.

In addition, similarly, a case where the unnecessary light 5 is incident on a synchronization signal sensor that detects the second light beam 102 to control a position where the intermediate image 231 is formed in the microlens array 23, is also conceivable. In this case, the amount of light detected by the synchronization signal sensor becomes unstable, and a synchronization signal is detected at a timing different from a timing at which detection needs to be performed, which causes a remarkably decrease in image quality of the intermediate image 231.

First Embodiment of Optical Scanning Unit 100

Next, an embodiment of the optical scanning unit 100 will be described in more detail. The optical scanning unit 100 according to the present embodiment prevents the decrease in contrast of the intermediate image 231 caused by the influence of the unnecessary light 5. In addition, the optical scanning unit 100 according to the present embodiment prevents an erroneous operation of the synchronization signal sensor for forming the intermediate image 231, and forms the intermediate image 231 with good image quality.

Figure 15:
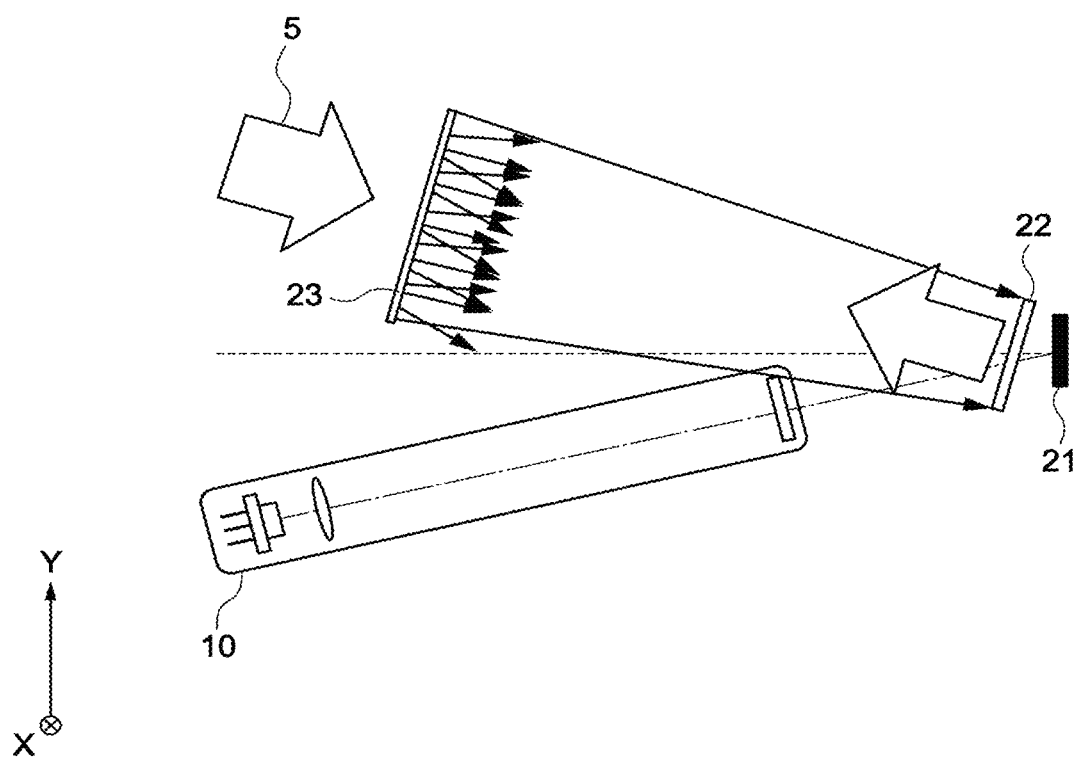
FIG. 15 is a view for describing unnecessary light related to the present invention.

FIG. 15 is a schematic view for describing the influence of the unnecessary light 5, and is an example of a cross section in the sub-scanning direction of the optical scanning unit 100. As illustrated in FIG. 15, a case where the transparent flat plate 22 is arranged to be parallel to the microlens array 23 is assumed. In the arrangement relationship as illustrated in FIG. 15, the unnecessary light 5 easily re-enters the microlens array 23. The re-entry herein means that the unnecessary light 5 becomes scattered light after passing through the microlens array 23 and entering the inside of the optical scanning unit 100, and is incident on the incidence surface of the microlens array 23.

When the unnecessary light 5 is scattered by the microlens array 23 in the case where the microlens array 23 and the transparent flat plate 22 are parallel, the scattered light is reflected by the transparent flat plate 22 or the MEMS mirror 21 and easily re-enters the microlens array 23. That is, when the microlens array 23 and the transparent flat plate 22 are parallel, there is a high possibility that the formation of the intermediate image 231 is adversely affected.

Figure 8:
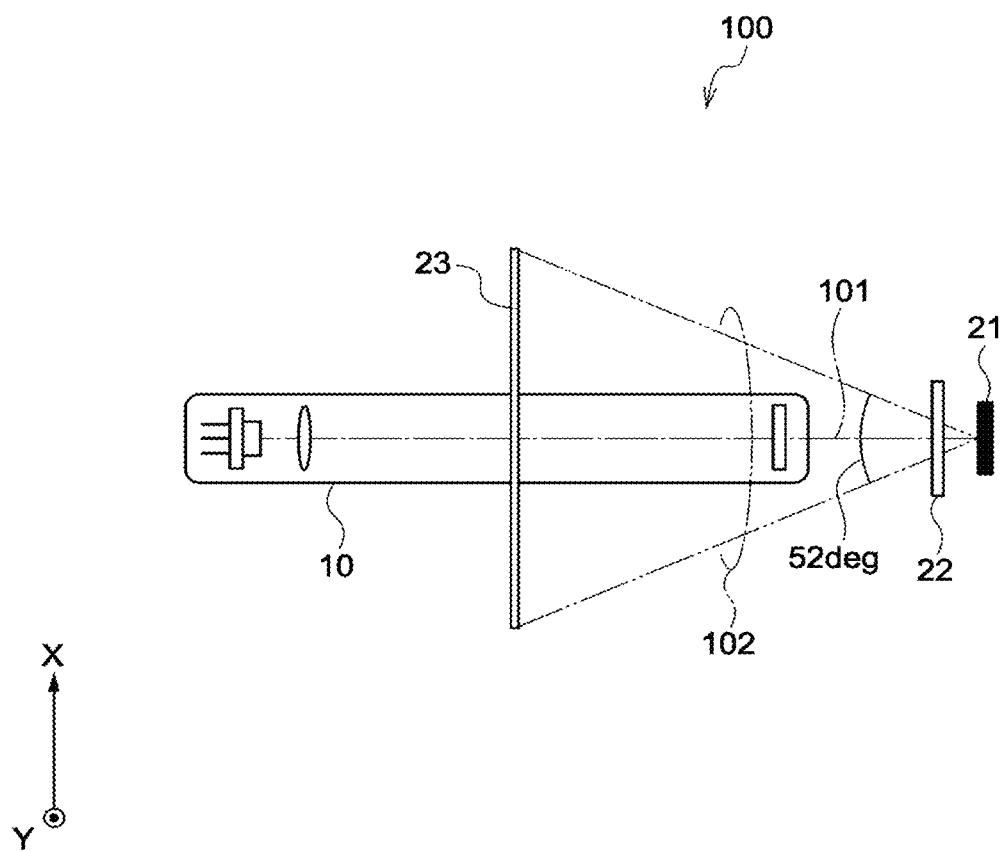
FIG. 8 is an optical arrangement view of an embodiment of an optical scanning device according to the present invention in a cross section in a main scanning direction.
Figure 9:
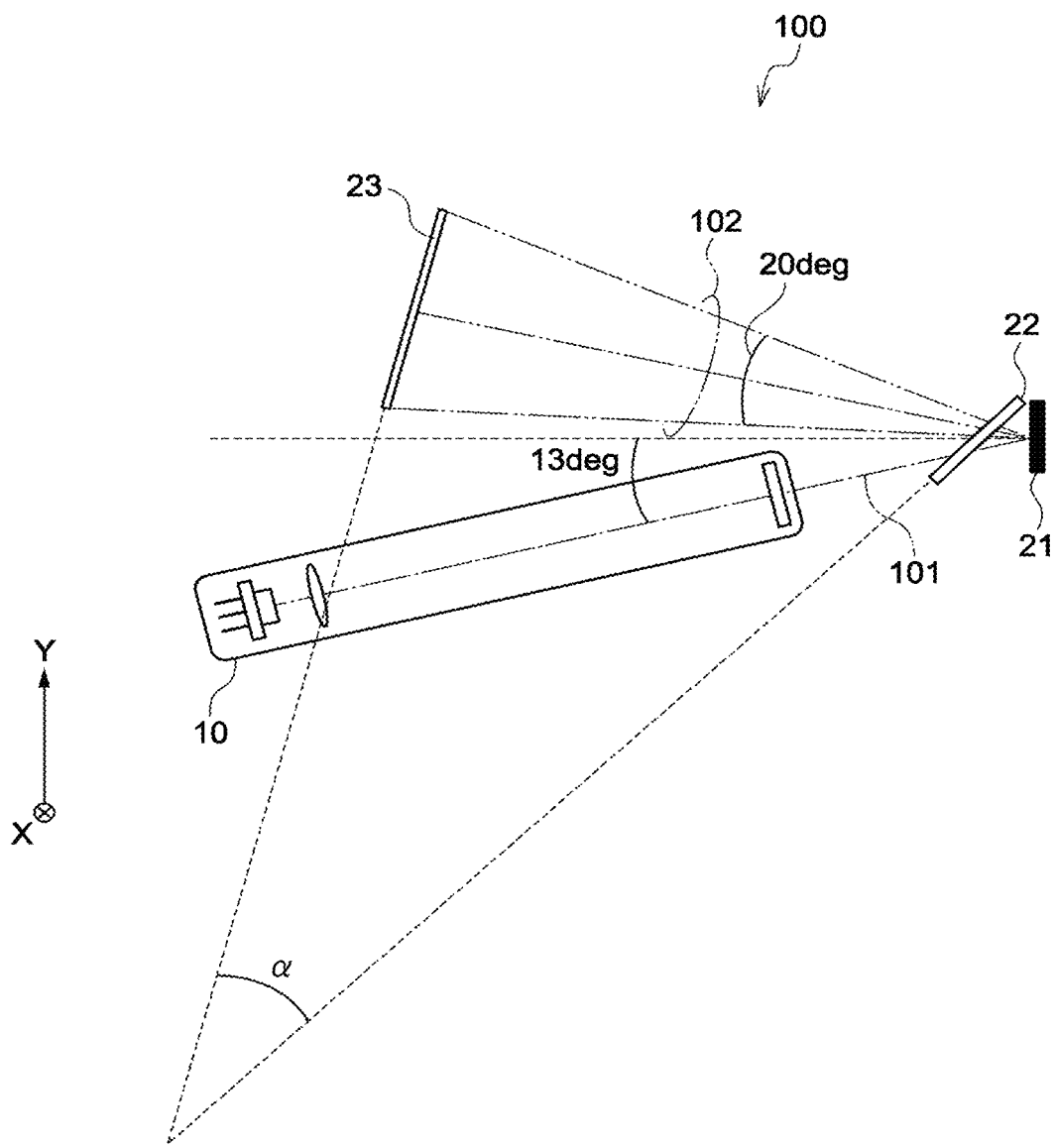
FIG. 9 is an optical arrangement view of the embodiment of the optical scanning device according to the present invention in a cross section in a sub-scanning direction.

The optical scanning unit 100 according to the present embodiment has an effect of preventing the above-described adverse effect by inclining the transparent flat plate 22 with respect to the microlens array 23 in a sub-scanning cross section as illustrated in FIGS. 8 and 9.

FIG. 8 illustrates an example of optical arrangement of the optical scanning unit 100 in a main scanning cross section. FIG. 9 illustrates an example of optical arrangement of the optical scanning unit 100 in the sub-scanning cross section. As illustrated in FIG. 8, the microlens array 23 and the transparent flat plate 22 are parallel to each other in the main scanning cross section. A spreading angle at which the MEMS mirror 21 deflects the second light beam 102 in the main scanning direction is, for example, 52 degrees. In this case, the synchronization signal sensor that detects the second light beam 102 is arranged at an end of the microlens array 23 in the main scanning direction, and the synchronization signal sensor detects the second light beam 102 to adjust the position of the intermediate image 231, thereby improving the image quality.

As illustrated in FIG. 9, the optical scanning unit 100 according to the present embodiment is arranged such that the transparent flat plate 22 is inclined with respect to the microlens array 23 in the sub-scanning cross section so as to form an angle α. As a result, even if the unnecessary light 5 incident from the microlens array 23 exists, it is difficult for the unnecessary light 5 to be reflected by the transparent flat plate 22 and re-enter the microlens array 23.

An inclination direction of the transparent flat plate 22 in the optical scanning unit 100 according to the present embodiment is defined based on two virtual lines diagonally connecting ends of the transparent flat plate 22 and ends of the microlens array 23. One line of the above-described two virtual lines forms an angle with a perpendicular line of the transparent flat plate 22 smaller than the other line does. The transparent flat plate 22 is inclined in a direction in which the angle formed between this one line and the perpendicular line of the transparent flat plate 22 increases.

Figure 10:
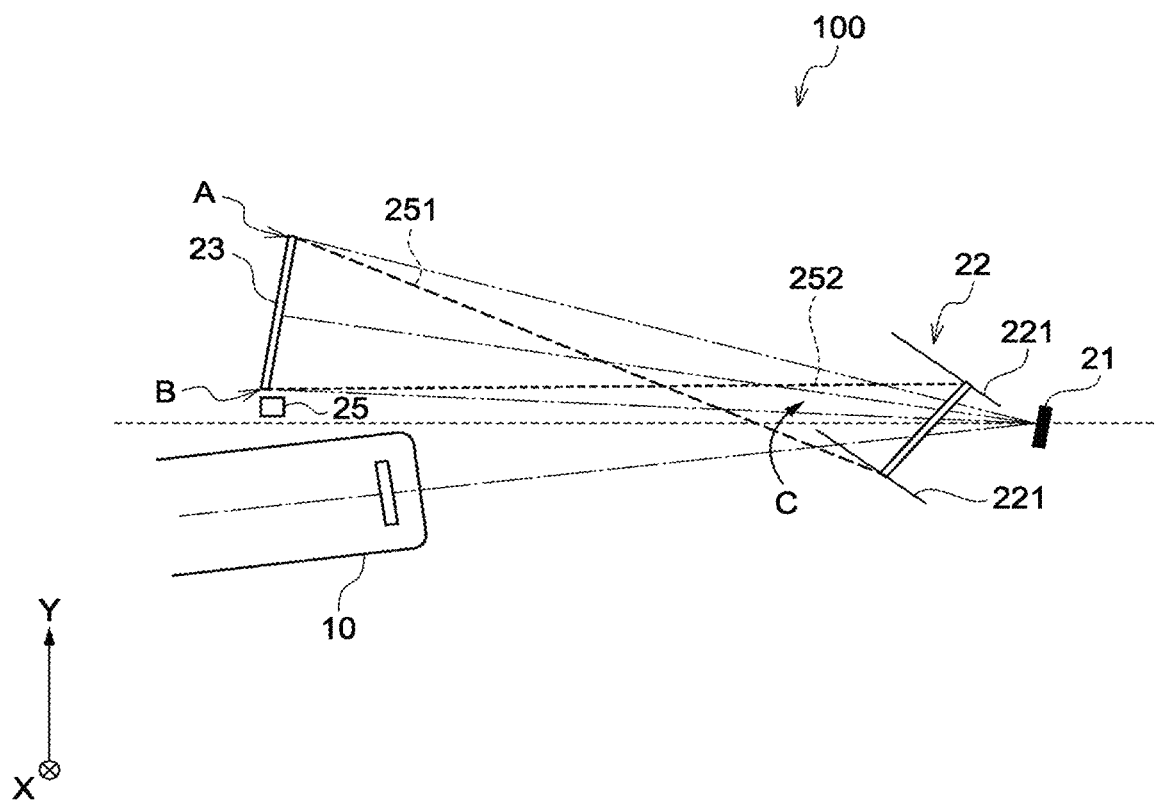
FIG. 10 is a view for describing the embodiment of the optical scanning device according to the present invention.

The inclination of the transparent flat plate 22 with respect to the microlens array 23 according to the present embodiment will be described in more detail. As illustrated in FIG. 10, one of ends of the microlens array 23 in the sub-scanning cross section will be referred to as an "end A", and the other end will be referred to as an "end B". In addition, in the sub-scanning cross section, a virtual line connecting the end A and an end of the transparent flat plate 22 diagonal to the end A will be referred to as a "first virtual line 251", and a virtual line connecting the end B and an end of the transparent flat plate 22 diagonal to the end B will be referred to as a "second virtual line 252".

When virtual perpendicular lines 221 are set at both the ends of the transparent flat plate 22 in the sub-scanning section, an angle formed between the first virtual line 251 and the perpendicular line 221 is smaller than an angle formed between the second virtual line 252 and the perpendicular line 221. That is, the transparent flat plate 22 of the optical scanning unit 100 is inclined in a direction C in which the angle formed between the first virtual line 251 and the perpendicular line 221 increases. In other words, the transparent flat plate 22 of the optical scanning unit 100 is inclined in a direction away from the state of being parallel to the microlens array 23.

Figure 11:
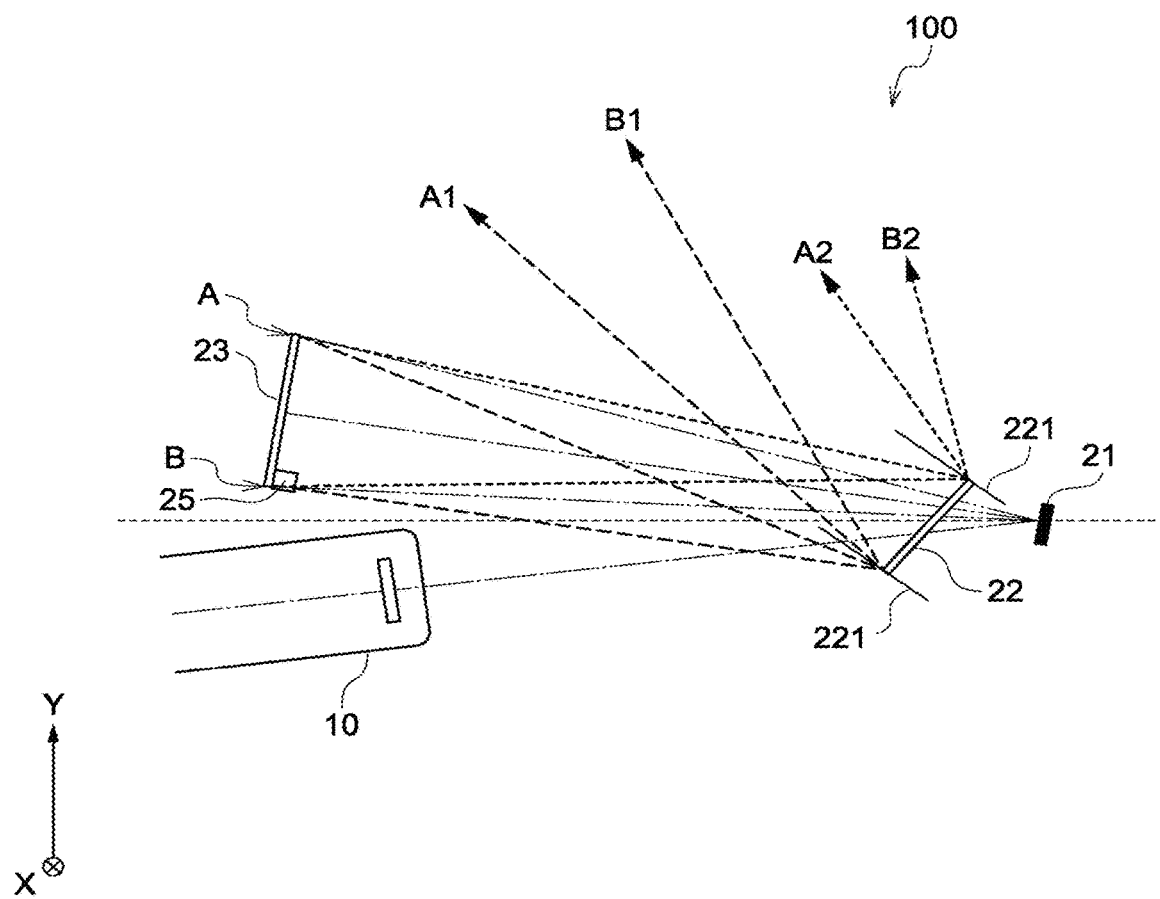
FIG. 11 is a view for describing an effect of the embodiment of the optical scanning device according to the present invention.

An effect of the case where the transparent flat plate 22 is inclined as described above will be described with reference to FIG. 11. Assuming optical paths of the unnecessary light 5 as illustrated in FIG. 11, the unnecessary light 5 from the end A of the microlens array 23 is directed in a direction indicated by a reference sign A1 or a reference sign A2 if being reflected at the end of the transparent flat plate 22. Similarly, the unnecessary light 5 from the end B of the microlens array 23 is directed in a direction indicated by a reference sign B1 or a reference sign B2 if being reflected at the end of the transparent flat plate 22.

When the transparent flat plate 22 is arranged to be inclined with respect to the microlens array 23 as illustrated in FIG. 10, a state where the unnecessary light 5 scattered from the microlens array 23 does not re-enter the microlens array 23 even if being reflected by the transparent flat plate 22 is reached.

When the transparent flat plate 22 is inclined in the direction C (see FIG. 10), an angle formed when the unnecessary light 5, which has been scattered from the end A of the microlens array 23, is reflected by one end of the transparent flat plate 22 in the sub-scanning cross section is larger than an angle formed when the unnecessary light 5 is reflected by the other end. This also applies to the unnecessary light 5 scattered from the end B of the microlens array 23. When the scattered unnecessary light 5 is reflected by the transparent flat plate 22, an optical path closest to the microlens array 23 in the sub-scanning cross section is an optical path corresponding to the reference sign A1. In other words, there is no unnecessary light 5 that is reflected to be closer to the microlens array 23 than the reference sign A1, and the other unnecessary light 5 is reflected in a direction away from the microlens array 23.

If the transparent flat plate 22 is inclined in a direction opposite to the direction C illustrated in FIG. 10, some of the unnecessary light 5 reflected by the transparent flat plate 22 returns to the microlens array 23. When the unnecessary light 5 returns to the microlens array 23, a part of the microlens array 23 which does not contribute to the formation of the intermediate image 231 at the relevant moment (relevant frame) is brightened. When such a state occurs, the part that is originally dark becomes bright so that the contrast of the intermediate image 231 decreases.

The optical scanning unit 100 according to the first embodiment described above can prevent the unnecessary light 5 from adversely affecting the intermediate image 231 since the scattered light from the whole region of the microlens array 23 does not re-enter the microlens array 23 even if being reflected by the transparent flat plate 22. As a result, it is possible to form the intermediate image 231 with the high contrast.

Second Embodiment of Optical Scanning Unit 100

Figure 12:
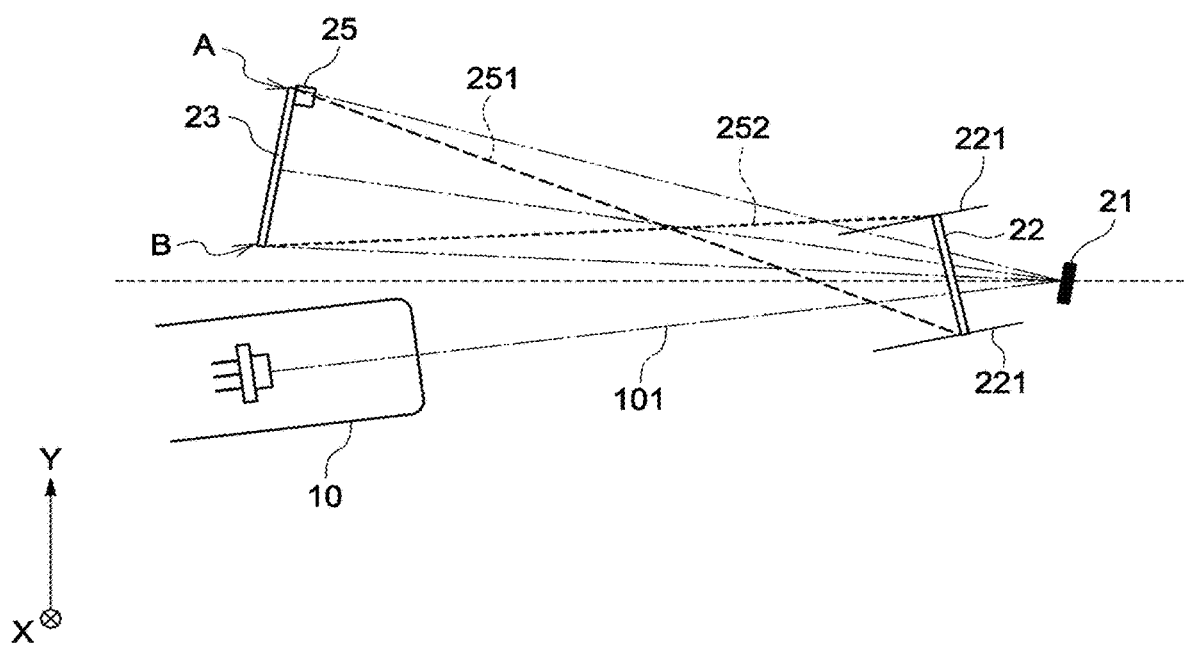
FIG. 12 is an optical arrangement view of another embodiment of the optical scanning device according to the present invention in a cross section in the sub-scanning direction.
Figure 13:
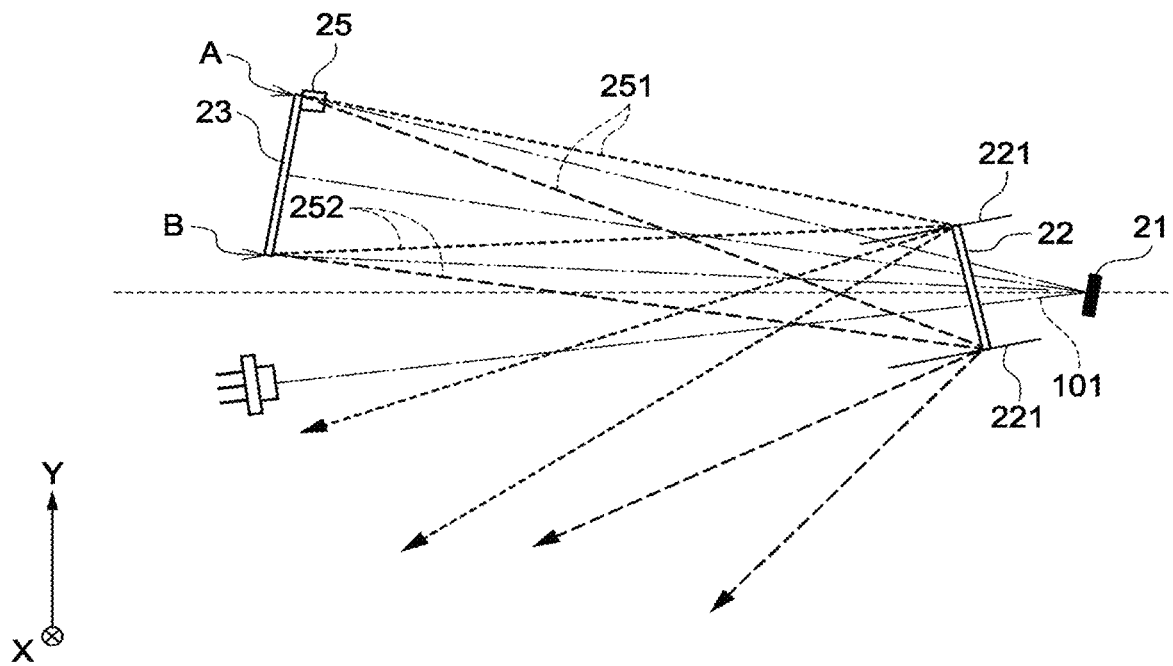
FIG. 13 is a view for describing an effect of another embodiment of the optical scanning device according to the present invention.

Next, another embodiment of the optical scanning device according to the present invention will be described with reference to FIGS. 12 and 13. Similarly to the above-described embodiment, one of the ends of the microlens array 23 in the sub-scanning cross section will be referred to as the "end A", and the other end will be referred to as the "end B". In the sub-scanning cross section, the virtual line connecting the end A and the end of the transparent flat plate 22 diagonal to the end A will be referred to as the "first virtual line 251", and the virtual line connecting the end B and the end of the transparent flat plate 22 diagonal to the end B will be referred to as the "second virtual line 252".

In the optical scanning unit 100 according to the present embodiment, an inclination direction of the transparent flat plate 22 in the sub-scanning cross section is different from the embodiment described above. That is, the transparent flat plate 22 is inclined with respect to the microlens array 23 such that the angle formed between the second virtual line 252 and the perpendicular line 221 of the transparent flat plate 22 is smaller than the angle formed between the first virtual line 251 and the perpendicular line 221 of the transparent flat plate 22. In other words, in the optical scanning unit 100 according to the second embodiment, the inclination direction of the transparent flat plate 22 is set to a direction in which the angle formed between the second virtual line 252 and the perpendicular line 221 increases, and in which the transparent flat plate 22 goes away from the state of being parallel to the microlens array 23.

When the transparent flat plate 22 is inclined as described above, the second virtual line 252 becomes a line that contains an end of the transparent flat plate 22 further from the first light beam 101 incident on the MEMS mirror 21, that is, the end at a position diagonal to the end B of the microlens array 23. When the inclination direction of the transparent flat plate 22 is set in this manner, it is possible to reduce incident angles of the light beams (the first light beam 101 and the second light beam 102) transmitted through the transparent flat plate 22, with respect to the transparent flat plate 22. As a result, the transparent flat plate 22 can be downsized, and the transmittance of the transparent flat plate 22 can be improved.

An effect obtained by inclining the transparent flat plate 22 as described above will be described with reference to FIG. 13. Assuming optical paths of the unnecessary light 5 as illustrated in FIG. 13, light reflected at one end of the transparent flat plate 22 travels on an optical path closest to the microlens array 23 out of the unnecessary light 5 from the end B of the microlens array 23, and the reflected unnecessary light 5 does not enter the microlens array 23. When the transparent flat plate 22 is inclined with respect to the microlens array 23 as illustrated in FIGS. 12 and 13, it is difficult for the unnecessary light 5 scattered from the microlens array 23 to re-enter the microlens array 23 even if being reflected by the transparent flat plate 22.

As described above, the optical scanning unit 100 according to the present embodiment can prevent the entry of the unnecessary light 5 in a case where the light source unit 10 is turned off or to a part where the intermediate image 231 is not formed on the microlens array 23 since the scattered light from the entire region of the microlens array 23 does not re-enter the microlens array 23 even if being reflected by the transparent flat plate 22. As a result, it is possible to form the high-contrast intermediate image 231.

In addition, a description will be given with reference to FIG. 14 regarding a reason why the transparent flat plate 22 can be made compact and the transmittance can be improved by reducing the incident angles of the light beams (the first light beam 101 and the second light beam 102) transmitted through the transparent flat plate 22 with respect to the transparent flat plate 22 as described above.

Figure 14:
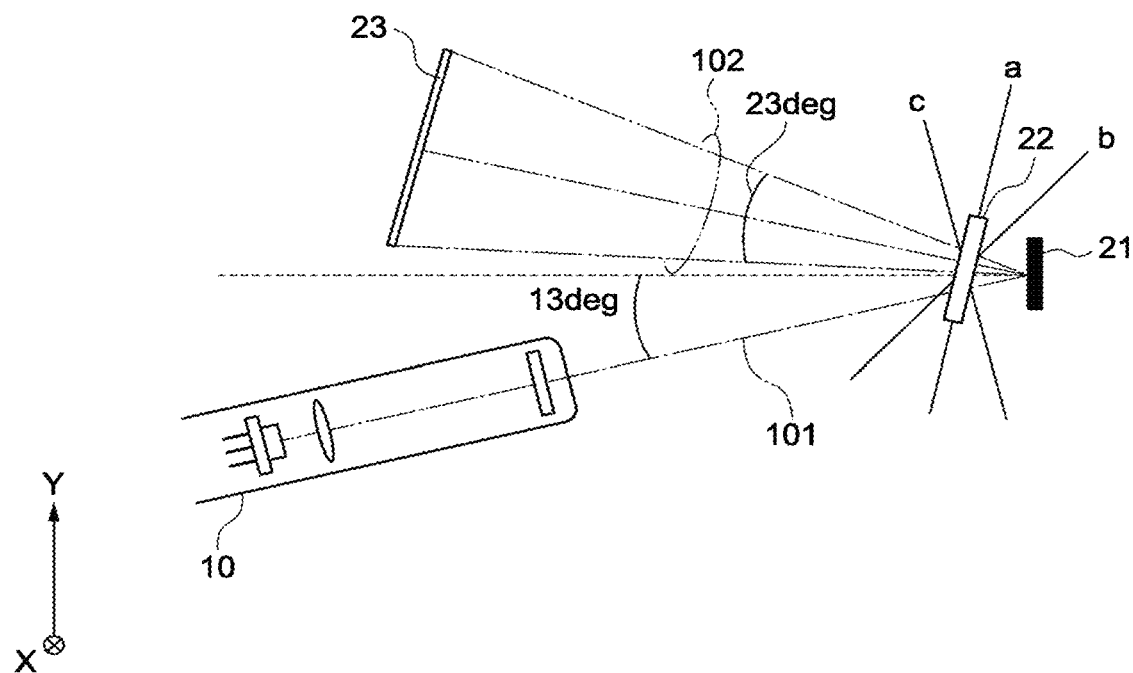
FIG. 14 is an optical arrangement view of still another embodiment of the optical scanning device according to the present invention in a cross section in the sub-scanning direction.

As illustrated in FIG. 14, the incident angle of the first light beam 101 incident on the MEMS mirror 21 from the light source unit 10 in the sub-scanning cross section is set to 13 degrees, and an amplitude (MEMS amplitude) of the MEMS mirror 21 in the sub-scanning cross section is set to ±5 degrees. In this case, the incidence side is 13 degrees and the emission side is 23 degrees (13 degrees+10 degrees) with respect to a sub-scanning amplitude center of the MEMS mirror 21.

If a center of the microlens array 23 coincides with a laser light arrival position at the center of the amplitude of the MEMS mirror 21 (MEMS amplitude center) and has a symmetric shape in the sub-scanning direction, the amounts of inclination of the transparent flat plate 22 inclined as described above are substantially the same. Therefore, it is possible to set the incident angle of the light beam to be transmitted through the transparent flat plate 22 to be smaller in the case in which the transparent flat plate 22 is inclined toward the incident light.

That is, it is more desirable to incline the transparent flat plate 22 toward the incident light to the MEMS mirror 21, from the viewpoint of downsizing the transparent flat plate 22 and improving the transmittance, in the MEMS mirror 21 that performs two-dimensional scanning.

In addition, it is possible to shorten a distance between the MEMS mirror 21 and the transparent flat plate 22 by reducing the inclination of the transparent flat plate 22. As a result, it is possible to reduce a region through which the first light beam 101 is transmitted. That is, it is possible to downsize the optical scanning unit 100 and lower the manufacturing cost.

Furthermore, the HUD 1 needs to make the intermediate image 231 brighter than the brightness of the background of the virtual image 2. That is, it is not desirable to lower the transmittance of light in the transparent flat plate 22 because a large amount of light is required due to the background of the virtual image 2. However, the incident angles of the transmitted light beams (the first light beam 101 and the second light beam 102) with respect to the transparent flat plate 22 are reduced according to the present embodiment, which leads to the improvement of the transmittance. In addition, it is also possible to reduce deviation in brightness in an incidence region (within an intermediate image region) of the second light beam 102 in the microlens array 23 where the intermediate image 231 is formed, and it is possible to improve display performance of the virtual image 2.

Since the optical scanning unit 100 according to the first or second embodiment described above is the laser scanning system, it is necessary to acquire a signal for controlling a light emission timing of the light source unit 10 in order to control a formation position of the intermediate image 231. This acquisition of the control signal is performed by a light receiving element 25 which is a synchronization signal sensor. The light receiving element is arranged in the sub-scanning cross section as illustrated in FIGS. 10 and 12.

The light receiving element 25 is desirably arranged at an end opposite to the end of the microlens array 23 contained in the line forming the smaller angle with the perpendicular line of the transparent flat plate 22 with respect to the center of the microlens array 23 in the sub-scanning cross section.

For example, in the arrangement illustrated in FIG. 10, the light receiving element 25 is arranged at the end B of the microlens array 23. In the case of the arrangement illustrated in FIG. 12, the light receiving element 25 is arranged at the end A of the microlens array 23. As a result, even when the unnecessary light 5 scattered from the microlens array 23 is reflected by the transparent flat plate 22, the unnecessary light 5 can be prevented from being incident on the light receiving element 25. When the light receiving element 25 is arranged outside the microlens array 23, particularly on a side where the unnecessary light 5 is released, it is unnecessary to set the amount by which the perpendicular line of the transparent flat plate 22 is inclined in the direction in which the angle formed by the transparent flat plate 22 and the microlens array 23 increases, to be large.

As described above, it is possible to prevent the unnecessary light 5 from being incident on the light receiving element 25 and to prevent the decrease in image quality with the optical scanning unit 100 according to any of the above-described embodiments. In addition, it is possible to set the incident angle of the light beam transmitted through the transparent flat plate 22 to be small without unnecessarily inclining the transparent flat plate 22 by a large amount. As a result, the transparent flat plate 22 can be downsized, and the transmittance can be improved.

In addition, in the optical scanning device according to any of the above-described embodiments, the transparent flat plate 22 is arranged to have an angle in the sub-scanning direction so as to prevent the incident light (first light beam 101) incident on the MEMS mirror 21 from being perpendicularly incident on the transparent flat plate 22. If the first light beam 101 is incident perpendicularly on the transparent flat plate 22, there is a possibility that the reflected light of the first light beam 101 returns to the light source unit 10.

When the light source unit 10 monitors the light amount of the first light beam 101, the light amount control becomes unstable as the light amount of the first light beam 101 fluctuates. Even in the light source unit 10 which does not monitor the amount of light, there is a case where an optical system that separates the incident light on the MEMS mirror 21 to monitor the amount of light, or the like is provided. In either case, it is not desirable that the first light beam 101 returns to the light source unit 10 by the transparent flat plate 22.

Therefore, when the transparent flat plate 22 is arranged to have the angle in the sub-scanning direction with respect to the incident light with respect to the MEMS mirror 21 as in the optical scanning unit 100 according to any of the above embodiments, it is possible to prevent the light from being reflected to the sensor that controls the amount of light or the like and to accurately control the light amount of the first light beam 101.

As described above, the HUD 1 can accurately perform reproduction of the color of color display and setting of the appropriate brightness with respect to the brightness of the background during the display of the virtual image 2.

Advantageous Effects of Invention

According to the HUD 1 described above, the first light beam 101 from the light source unit 10 is used for two-dimensional scanning by the MEMS mirror 21 having the single reflection surface 2101 and is imaged to form the intermediate image 231 on the microlens array 23 which is a surface to be scanned. In the optical scanning unit 100 configured to form the intermediate image 231, the transparent flat plate 22 to be arranged for the purpose of improving the operation accuracy of the MEMS mirror 21 and improving the image quality is arranged so as to satisfy a predetermined condition in the sub-scanning cross section. Here, the predetermined condition means the inclination direction of the transparent flat plate 22 with respect to the line, which forms the smaller angle with the perpendicular line of the transparent flat plate 22, of the two lines each of which diagonally connects an end of the transparent flat plate 22 and an end of the microlens array 23. The inclination direction is the direction in which the angle formed by the transparent flat plate 22 and the microlens array 23 increases, with respect to the perpendicular line of the transparent flat plate 22.

As a result, even if the unnecessary light 5 reaching the microlens array 23 from the outside is scattered by the microlens array 23, it is possible to prevent the scattered light from re-entering the microlens array 23 at the time of forming the intermediate image 231. Therefore, the HUD 1 can form the high-contrast intermediate image 231 and display the high-contrast virtual image 2. In addition, the synchronization signal for controlling the formation position of the intermediate image 231 can be constantly acquired in a stable manner, and the image quality of the intermediate image 231 can be improved.

In addition, the line forming the smaller angle with the perpendicular line of the transparent flat plate 22 may be the line containing the end of the transparent flat plate 22 further from the light beam (first light beam 101) incident on the MEMS mirror 21. According to this, it is possible to downsize the transparent flat plate 22 and to secure the transmittance.

In addition, at least the single light receiving element 25 configured to obtain the signal for determining the scanning timing, is arranged at the end opposite to the end of the microlens array 23 contained in the line forming the smaller angle with the perpendicular line of the transparent flat plate 22, with respect to the center of the microlens array 23 in the sub-scanning cross section. As a result, it is possible to obtain the optical scanning unit 100 capable of realizing the stable image formation without being affected by the unnecessary light 5.

In addition, it is possible to obtain the compact HUD 1 with high image quality by providing the optical scanning unit 100 as described above.

REFERENCE SIGNS LIST

1 HUD
10 LIGHT SOURCE UNIT
20 SCANNING OPTICAL SYSTEM
21 MEMS MIRROR
23 MICRO LENS ARRAY
100 OPTICAL SCANNING UNIT
101 FIRST LIGHT BEAM
102 SECOND LIGHT BEAM
103 IMAGE LIGHT
210 MICRO MIRROR
231 INTERMEDIATE IMAGE

CITATION LIST

Patent Literature

Patent Literature 1: Japanese Patent No. 5050862

The invention claimed is:

1. An optical scanning device, comprising:
    a light source configured to emit a light beam;
    a light deflector configured to two-dimensionally deflect the light beam in a main scanning direction and a sub-scanning direction orthogonal to the main scanning direction; and
    an image former configured to form an image by two-dimensional scanning of the light beam performed by the light deflector, wherein
    a flat plate configured to transmit light incident on the light deflector and deflected reflection light from the light deflector, is arranged in an optical path of the light beam between the light deflector and the image former, and
    in a cross section in the sub-scanning direction, the flat plate is inclined in a direction in which an angle increases, the angle being formed by a virtual line, which forms a smaller angle with a perpendicular line of the flat surface, of two virtual lines each of which diagonally connects an end of the flat plate and an end of the image former, and the perpendicular line of the flat surface.

2. The optical scanning device according to claim 1, wherein the virtual line is a line containing an end, which is further from the light beam incident on the light deflector, of the flat plate.

3. The optical scanning device according to claim 1, further comprising:
    a light receiver configured to acquire a signal to control a timing of the two-dimensional scanning in the image former, wherein
    the light receiver is arranged at a first end opposite to a second end, which the virtual line contains, of the image former with respect to a center of the image former in the cross section in the sub-scanning direction.

4. The optical scanning device according to claim 1, wherein the flat plate has an angle in the sub-scanning direction with respect to the light incident on the light deflector.

5. An image display device, comprising,
    the optical scanning device according to claim 1, wherein an intermediate image generated by the image former is displayed as a virtual image.

6. A vehicle, comprising:
    the image display device according to claim 5, wherein the intermediate image is displayed as the virtual image to a driver.

* * * * *